United States Patent
Sato (10) Patent No.: US 10,839,317 B2
(45) Date of Patent: Nov. 17, 2020

(54) CONTROL DEVICE AND MACHINE LEARNING DEVICE

(71) Applicant: FANUC CORPORATION, Yamanashi (JP)

(72) Inventor: Kazuo Sato, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 246 days.

(21) Appl. No.: 16/022,830

(22) Filed: Jun. 29, 2018

(65) Prior Publication Data

US 2019/0005413 A1    Jan. 3, 2019

(30) Foreign Application Priority Data

Jun. 30, 2017 (JP) ................ 2017-128393

(51) Int. Cl.
| | |
|---|---|
| *G06N 20/00* | (2019.01) |
| *G05B 19/4061* | (2006.01) |
| *G06N 3/08* | (2006.01) |
| *G05B 19/402* | (2006.01) |

(52) U.S. Cl.
CPC ......... *G06N 20/00* (2019.01); *G05B 19/402* (2013.01); *G05B 19/4061* (2013.01); *G06N 3/08* (2013.01); *G05B 2219/37237* (2013.01); *G05B 2219/49153* (2013.01)

(58) Field of Classification Search
CPC ............. G05B 19/402; G05B 19/4061; G05B 2219/37237; G05B 2219/49153; B23Q 17/2208; G06N 20/00; G06N 3/08; G06N 99/005

USPC ......................................... 706/12
See application file for complete search history.

(56) References Cited

U.S. PATENT DOCUMENTS

| | | | |
|---|---|---|---|
| 5,142,210 A * | 8/1992 | Kojima | G05B 19/4062 318/275 |
| 6,512,961 B1 | 1/2003 | Fukaya et al. | |
| 2008/0082200 A1* | 4/2008 | Ikeda | G05B 19/406 700/160 |

(Continued)

FOREIGN PATENT DOCUMENTS

| | | |
|---|---|---|
| CN | 101156118 A | 4/2008 |
| CN | 102326066 A | 1/2012 |

(Continued)

OTHER PUBLICATIONS

Teti et al., "Advanced monitoring of machining operations", CIRP Annals—Manufacturing Technology, 2010. (Year: 2010).*

(Continued)

*Primary Examiner* — Dave Misir
(74) *Attorney, Agent, or Firm* — Hauptman Ham, LLP (57) ABSTRACT

A control device includes a machine learning device that learns a state of a spindle during normal machining without a collision of the spindle, and the machine learning device includes a state observation unit that observes spindle estimated load torque data indicating an estimated load torque value for the spindle and spindle acceleration data indicating an acceleration value of the spindle as state variables representing a current state of an environment and a learning unit that learns a correlation between the estimated load torque values for the spindle and the acceleration values of the spindle during the normal machining with use of the state variables.

14 Claims, 5 Drawing Sheets

(56) References Cited

U.S. PATENT DOCUMENTS

| | | | | |
|---|---|---|---|---|
| 2008/0133439 | A1* | 6/2008 | Ikeda | G01H 1/003 |
| | | | | 706/20 |
| 2009/0048713 | A1 | 2/2009 | Glissmann et al. | |
| 2010/0030521 | A1 | 2/2010 | Akhrarov et al. | |
| 2012/0035802 | A1 | 2/2012 | Suzuki et al. | |
| 2012/0221137 | A1* | 8/2012 | Kettemer | G05B 19/4061 |
| | | | | 700/108 |
| 2014/0180467 | A1 | 6/2014 | Sato et al. | |
| 2015/0352679 | A1* | 12/2015 | Yamamoto | B23Q 17/007 |
| | | | | 73/865.8 |
| 2017/0031329 | A1* | 2/2017 | Inagaki | B25J 9/163 |
| 2017/0031331 | A1 | 2/2017 | Morita | |
| 2017/0032283 | A1* | 2/2017 | Kamiya | G06N 20/00 |
| 2017/0090430 | A1* | 3/2017 | Nakazawa | H02P 29/60 |
| 2019/0265657 | A1 | 8/2019 | Inagaki et al. | |

FOREIGN PATENT DOCUMENTS

| | | |
|---|---|---|
| CN | 102615551 A | 8/2012 |
| CN | 103064340 A | 4/2013 |
| CN | 103901817 A | 7/2014 |
| CN | 104981323 A | 10/2015 |
| CN | 106409120 A | 2/2017 |
| CN | 106411210 A | 2/2017 |
| JP | H3-213248 A | 9/1991 |
| JP | 2007164406 A | 6/2007 |
| JP | 2016-193469 A | 11/2016 |
| JP | 2017-64837 A | 4/2017 |
| WO | 00/10769 A1 | 3/2000 |

OTHER PUBLICATIONS

Wu et al., "Cloud-Based Machine Learning for Predictive Analytics: Tool Wear Prediction in Milling", 2016 IEEE International Conference on Big Data, 2016. (Year: 2016).*

Kakumoto Masahiko, "Abutment Detection Method of Machine Tool and Device", JP2016193469 (A), Nov. 17, 2016 (Year: 2016).*

Ikeda Kazutaka, "Tool Attaching Abnormality Detecting Device", JP2008087094A, Apr. 17, 2008. (Year: 2008).*

* cited by examiner

CONTROL DEVICE AND MACHINE LEARNING DEVICE

RELATED APPLICATIONS

The present application claims priority of Japanese Application Number 2017-128393, filed on Jun. 30, 2017, the disclosure of which is hereby incorporated by reference herein in its entirety.

BACKGROUND OF THE INVENTION

1. Field of the Invention

The present invention relates to a control device and a machine learning device and particularly relates to a control device and a machine learning device that are capable of detecting a spindle collision.

2. Description of the Related Art

In a machine tool that is controlled by a control device, a spindle may collide with a workpiece, a jig, or the like because of an erroneous operation of a machine by an operator, a programming glitch, a setting error for a tool to be used, or the like. When a spindle collision occurs, the machine tool may fail at the time. On the other hand, there is a case in which no problem may be found in operations of the machine tool at the time of the spindle collision but a failure in the machine tool may be found after a lapse of a certain time period through detection of occurrence of abnormal noises from the spindle or a decrease in a machining accuracy for a workpiece. In the latter case, information on coordinate values and an actual speed of the spindle of the machine tool, a tool offset set by the control device in machining by the machine tool, machining programs in operation, and the like may be stored in a storage device included in the control device with use of a technique disclosed in International Publication No. 00/10769, for instance, and it may be indirectly estimated, by analysis of the information, that the spindle collided in the past and that the failure was caused by the collision of the spindle.

Meanwhile, as a method of directly detecting a spindle collision in the machine tool that is controlled by the control device, the method with use of an abnormal load detecting function by which occurrence of an abnormal load on the spindle is detected is conceivable. In the abnormal load detecting function, in case where a value (estimated load torque) given by subtraction of a theoretical current value relating to the machining from a load current value monitored for each control axis is equal to or greater than a given value, it is determined that a spindle collision occurred and an alarm is given to the control device (Japanese Patent Application Laid-Open No. 2016-193469 and the like).

As another method of directly detecting a spindle collision in the machine tool that is controlled by the control device, the method with use of an acceleration sensor is conceivable. For use of the acceleration sensor for detection of a spindle collision, the acceleration sensor is mounted on the spindle and a sensor value on the acceleration sensor is read out on a side of the control device. In case where the sensor value that has been read out is equal to or greater than a given value, it is determined that a spindle collision occurred and an alarm is raised.

In both of the method with use of the abnormal load detecting function and the method with use of the acceleration sensor, however, it is difficult to find a reference value for determination as a collision of the spindle. In case where a reference value of the estimated load torque for the determination as a collision of the spindle is set low in the abnormal load detecting function, it may be misunderstood that a spindle collision has occurred, though normal machining is carried out. In case where a reference value of the estimated load torque for the determination as a collision of the spindle is set high, there may be a failure to detect a spindle collision that has actually occurred. The same is true of the method with use of the acceleration sensor.

In case where a spindle collision is determined based on a load current, in particular, a distinction between heavy cutting and the spindle collision is difficult to made. In case where a spindle collision is determined with use of the acceleration sensor, in particular, a distinction between a rapid traverse at a high speed and the spindle collision is difficult to make.

SUMMARY OF THE INVENTION

An object of the present invention is to provide a control device and a machine learning device that accurately detect a spindle collision without effort to set a reference value that is used for determination of the spindle collision.

In the invention, detection of an abnormal load on a spindle and detection of acceleration of the spindle are used in combination and a machine learning device is introduced into a control device, the machine learning device learning a relationship between estimated load torque values for the spindle and acceleration values of the spindle during normal movement of the spindle. The control device of the invention causes the machine learning device to make a determination on a collision of the spindle based on an estimated load torque value for the spindle and an acceleration value of the spindle and raises an alarm on the collision of the spindle, based on a result of the determination.

One aspect of the invention is the control device that detects a collision of the spindle included in the machine tool, and the control device includes the machine learning device that learns a state of the spindle during normal machining without the collision of the spindle. The machine learning device includes a state observation unit that observes spindle estimated load torque data indicating an estimated load torque value for the spindle and spindle acceleration data indicating an acceleration value of the spindle as state variables representing a current state of an environment, and a learning unit that learns a correlation between the estimated load torque values for the spindle and the acceleration values of the spindle during the normal machining with use of the state variables.

Another aspect of the invention is the machine learning device that learns the state of the spindle during the normal machining without the collision of the spindle included in the machine tool. The machine learning device includes the state observation unit that observes the spindle estimated load torque data indicating an estimated load torque value for the spindle and the spindle acceleration data indicating an acceleration value of the spindle, as the state variables representing the current state of the environment, and the learning unit that learns the correlation between the estimated load torque values for the spindle and the acceleration values of the spindle during the normal machining, with use of the state variables.

According to the present invention, a spindle collision can be accurately detected without trial and error for setting of a reference value of abnormal load and a reference value of acceleration for determination as the spindle collision and thus effort an operator makes in the setting can be saved.

BRIEF DESCRIPTION OF THE DRAWINGS

The above-mentioned and other objects and features of the invention will become apparent from the following description of the embodiments with reference to the accompanying drawings, in which.

DETAILED DESCRIPTION OF THE PREFERRED EMBODIMENTS

Hereinbelow, embodiments of the invention will be described in conjunction with the drawings.

Figure 1:
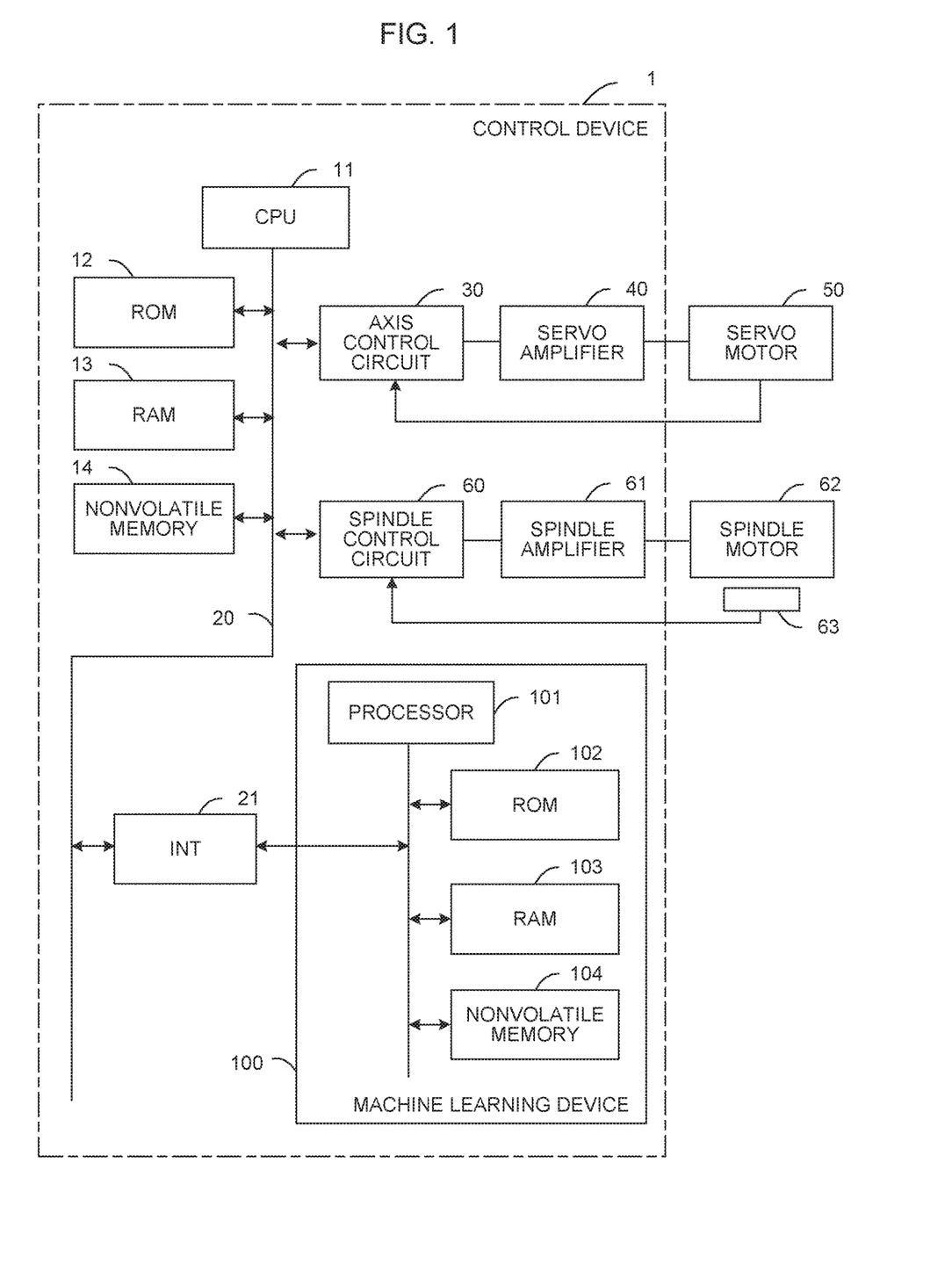
FIG. 1 is a schematic hardware configuration illustrating a control device according to a first embodiment.

FIG. 1 is a schematic hardware configuration illustrating major parts of a control device according to a first embodiment. The control device 1 may be implemented as a numerical controller that controls a machine tool including a spindle, for instance. A CPU 11 included in the control device 1 according to the embodiment is a processor that generally controls the control device 1. The CPU 11 reads out system programs stored in a ROM 12 via a bus 20 and controls the whole control device 1 in accordance with the system programs. Temporary calculation data and display data, various types of data inputted by an operator through an input unit not illustrated, and the like are temporary stored in a RAM 13.

A nonvolatile memory 14 is configured as a memory which is backed up by a battery not illustrated, for instance, and in which storage status is retained even when the control device 1 is powered off. Various types of data (such as machining conditions and sampling data of estimated load torque values and acceleration sensor values during normal machining (without a spindle collision)) inputted by the operator through the input unit not illustrated, machining programs for control inputted through an interface not illustrated, and the like are stored in the nonvolatile memory 14. The programs, the various types of data, and the like that are stored in the nonvolatile memory 14 may be expanded in the RAM 13 for execution/use. The various system programs necessary fir operations of the control device 1 (including system programs for controlling interaction with a machine learning device 100 that will be described later) such as system programs for analyzing and executing the machining programs have been written in advance into the ROM 12.

Axis control circuits 30 for controlling axes included in the machine tool receive travel distance instructions for the axes from the CPU 11 and output instructions for the axes to servo amplifiers 40. The servo amplifiers 40 receive the instructions and drives servo motors 50 that move the axes included in the machine tool. The servo motors 50 for the axes house position/speed/torque detectors, feed back position/speed/torque feedback signals from the position/speed/torque detectors to the axis control circuits 30, and carry out feedback control over positions/speeds/torques. The CPU 11 may calculate acceleration of the each axis by using feedback values of the positions and the speeds fed back to the axis control circuits 30. Though the axis control circuits 30, the servo amplifiers 40, and the servo motors 50 are each illustrated as only one element in the hardware configuration of FIG. 1, a number of the axis control circuits 30, the servo amplifiers 40, and the servo motors 50 that are actually provided is equal to a number of the axes included in the machine tool to be controlled.

A spindle control circuit 60 receives spindle rotation instructions for the machine tool and outputs spindle speed signals to a spindle amplifier 61. The spindle amplifier 61 receives the spindle speed signals, rotates a spindle motor 62 of the machine tool at a rotation speed based on the instructions, and thereby drives a tool.

A position coder 63 is coupled to the spindle motor 62 and outputs return pulses in synchronization with rotation of the spindle. The return pulses are read by the CPU 11.

An interface 21 is intended for making a connection between the control device 1 and the machine learning device 100. The machine learning device 100 includes a processor 101 which controls the whole machine learning device 100, a RUM 102 in which the system programs and the like are stored, a RAM 103 for temporary storage in processing related to machine learning, and a nonvolatile memory 104 which is used for storage of a learning model or the like. The machine learning device 100 may observe various types of information (such as the machining conditions and the estimated load torque values or the acceleration of the servo motors 50 that drive the axes for movement of the spindle) that may be acquired by the control device 1 via the interface 21. In response to a result of the determination on the spindle collision that is outputted from the machine learning device 100, the control device 1 raises an alarm or exercises stop control over the servo motors 50 or the like.

Figure 2:
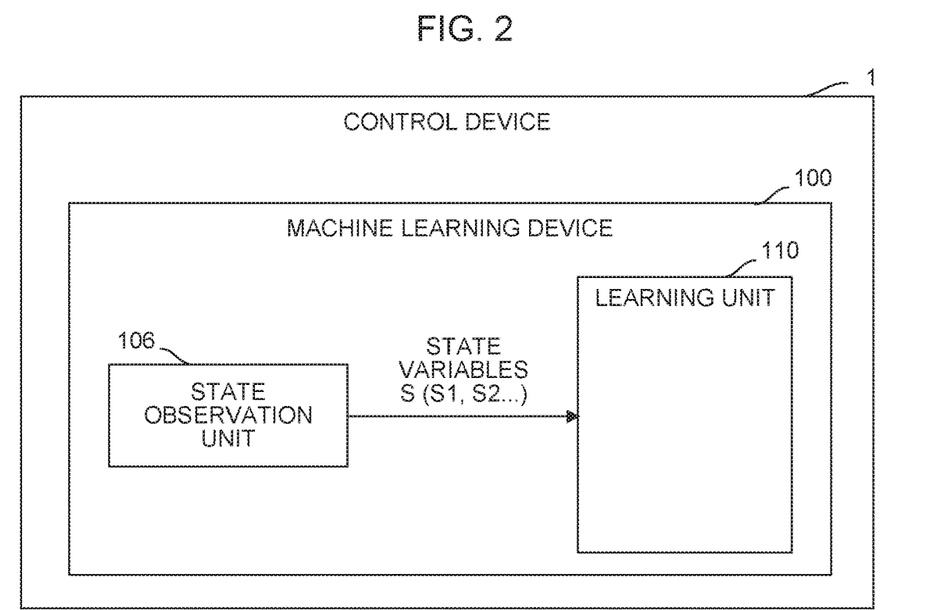
FIG. 2 is a schematic functional block diagram illustrating the control device according to the first embodiment.

FIG. 2 is a schematic functional block diagram illustrating the control device 1 and the machine learning device 100 according to the first embodiment. The machine learning device 100 includes software (such as learning algorithms) and hardware (such as the processor 101) for self-learning through so-called machine learning on operating conditions of the spindle (conditions grasped based on the estimated load torque value for the spindle and the acceleration value of the spindle) during the normal machining (without the spindle collision). What the machine learning device 100 included in the control device 1 learns is equivalent to a model structure that represents a correlation between the estimated load torque values for the spindle and the acceleration values of the spindle during normal operation of the spindle.

As illustrated as functional blocks in FIG. 2, the machine learning device 100 included in the control device 1 includes a state observation unit 106 that observes state variables S including spindle estimated load torque data S1 indicating the estimated load torque value for the spindle during the normal machining (without the spindle collision) and spindle acceleration data S2 indicating the acceleration value of the spindle during the normal machining (without the spindle collision) and a learning unit 110 that learns a correlation between the operating conditions of the spindle and the acceleration values of the spindle during the normal machining (without the spindle collision) with use of the state variables S.

The state observation unit 106 may be configured as a function of the processor 101, for instance. Alternatively the state observation unit 106 may be configured as software that is intended for making the processor 101 function and that is stored in the ROM 102, for instance.

As the spindle estimated load torque data S1 among the state variables S that are observed by the state observation unit 106, there may be used values calculated from feedback values of the torques of the servo motors 50 that drive the axes for the movement of the spindle, for instance. In a so-called training period for the machine learning device 100, however, it is desirable to use sampling data extracted based on specified conditions from the estimated load torque values for the spindle during the normal machining (without the spindle collision) recorded with use of a data logger not illustrated or the like during machining in the past.

As the spindle acceleration data S2 among the state variables S, there may be used the acceleration of the spindle calculated from the feedback values of the positions or the speeds of the servo motors 50 that drive the axes for the movement of the spindle or the acceleration of the spindle detected with use of the acceleration sensor mounted on the spindle or the like. In the so-called training period for the machine learning device 100, however, it is desirable to use sampling data extracted based on specified conditions from the acceleration values for the spindle during the normal machining (without the spindle collision) recorded with use of the data logger not illustrated or the like during machining in the past.

The learning unit 110 may be configured as a function of the processor 101, for instance. Alternatively the learning unit 110 may be configured as software that is intended for making the processor 101 function and that is stored in the ROM. 102, for instance. The learning unit 110 learns the correlation between the estimated load torque values for the spindle during the normal machining (without the spindle collision) and the acceleration values of the spindle during the same period in accordance with a desired learning algorithm that is generically referred to as machine learning. The learning unit 110 is capable of iteratively executing learning that is based on a data set including the state variables S described above.

By iteration of such a learning cycle, the learning unit 110 automatically interprets a feature (cluster set) that implies the correlation between the estimated load torque values for the spindle (spindle estimated load torque data S1) during the normal machining (without the spindle collision) and the acceleration values of the spindle (spindle acceleration data S2) during the same period. Though the correlation between the spindle estimated load torque data S1 and the spindle acceleration data S2 is substantially unknown when the learning algorithm is started, the learning unit 110 interprets the correlation by gradually identifying the feature as the learning advances. When the correlation between the spindle estimated load torque data S1 and the spindle acceleration data S2 is interpreted to a level that is reliable to a certain degree, results of the learning that are iteratively outputted by the learning unit 110 are made usable for determination on a current state (that is, the estimated load torque value for the spindle and the acceleration value of the spindle at present) as to whether the spindle normally operates or not (whether the spindle does not normally operate). That is, by the learning unit 110, a correlation model between the estimated load torque values for the spindle during the normal machining (without the spindle collision) and the acceleration values of the spindle during the same period can be gradually made closer to an optimal solution with advance in the learning algorithm.

In the machine learning device 100 included in the control device 1, as described above, the learning unit 110 learns the correlation between the estimated load torque values for the spindle during the normal machining (without the spindle collision) and the acceleration values of the spindle during the same period in accordance with the machine learning algorithm with use of the state variables S observed by the state observation unit 106. The state variables S are configured with use of the spindle estimated load torque data S1 and the spindle acceleration data S2, which resist influence of disturbance, and are uniquely found based on operating conditions of the servo motors 50 acquired by the control device 1. According to the machine learning device 100 included in the control device 1, therefore, use of results of the learning by the learning unit 110 makes it possible to automatically and accurately determine whether the operating conditions of the spindle are the operating conditions during the normal machining (without the spindle collision) or not, from a relationship between the estimated load torque values for the spindle and the acceleration values of the spindle, without calculation or estimation.

Provided that normality/abnormality of the operating conditions of the spindle can be automatically determined without calculation or estimation, it can be promptly determined whether the operating conditions of the spindle of the machine tool are the operating conditions during the normal machining (without the spindle collision) or not, only by grasp of the estimated load torque value for the spindle (spindle estimated load torque data S1) and the acceleration value of the spindle (spindle acceleration data S2).

In a modification of the machine learning device 100 included in the control device 1, the state observation unit 106 is capable of further observing machining condition data S3 including conditions of machining such as material of a workpiece to be machined, a type of a tool used for the machining, and stiffness of the machine tool, as the state variables S.

In such an operation, the machining condition data S3 may be acquired from setting values relating to the machining conditions inputted into the control device 1 through the input unit not illustrated.

The modification makes it possible for the machine learning device 100 to further interpret a correlation with the machining conditions in addition to the estimated load torque values for the spindle and the acceleration values of the spindle and to cope with a case where the estimated load torque value for the spindle and the acceleration value of the spindle vary in accordance with the machining conditions.

In another modification of the machine learning device 100 included in the control device 1, the state observation unit 106 is capable of further observing spindle generated sound data S4 including information on spindle generated sounds such as magnitudes and frequencies of sounds generated from the spindle, as the state variables S.

As for the spindle generated sound data S4, a sound sensor or the like may be provided adjacent to the spindle of the machine tool and values detected by the provided sound sensor may be acquired through the control device 1, for instance.

The modification makes it possible for the machine learning device 100 to further interpret a correlation with the information on the spindle generated sounds in addition to the estimated load torque values for the spindle and the acceleration values of the spindle and to detect a spindle collision more accurately.

In another modification of the machine learning device 100 included in the control device 1, the learning unit 110 is capable of using the state variables S acquired for each of a plurality of machine tools that carry out the same machining and thereby learning the correlation between the estimated load torque values for the spindle and the acceleration values of the spindle during the normal machining (without the spindle collision) in the machine tools. According to this configuration, because a quantity of the data sets including the state variables S that can be acquired within a given period can be increased, a speed and reliability of the learning of the correlation between the estimated load torque values for the spindle and the acceleration values of the spindle during the normal machining (without the spindle collision) in the machine tools can be improved with more diverse data sets used as input.

Figure 3:
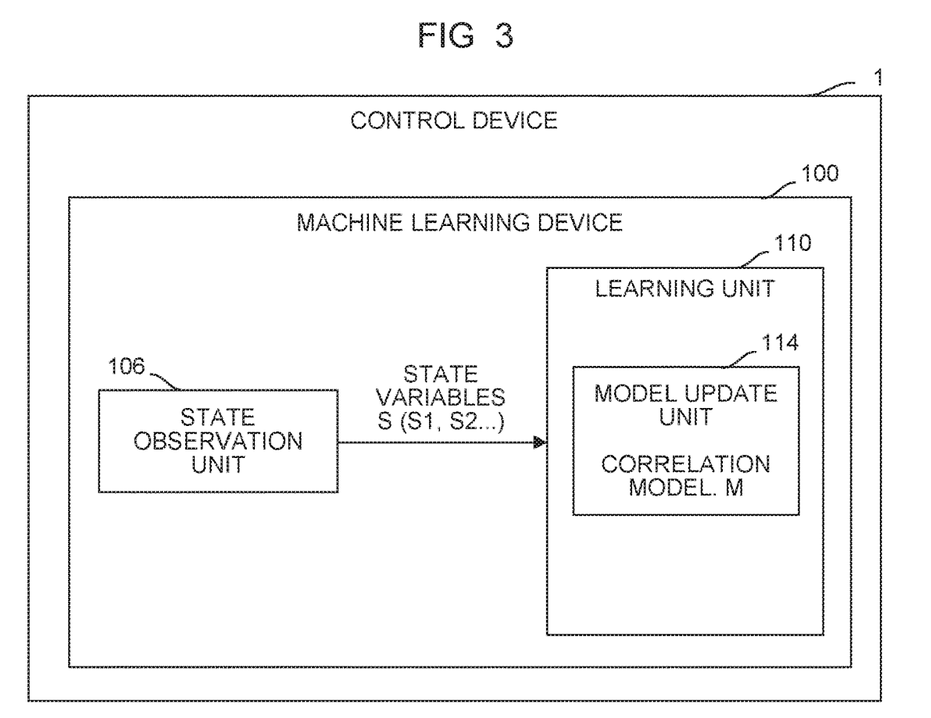
FIG. 3 is a schematic functional block diagram illustrating a mode of the control device.

In the machine learning device 100 having the above configuration, there is no particular limitation on the learning algorithm that is executed by the learning unit 110 and a learning algorithm that is publicly known for machine learning may be employed. FIG. 3 illustrates a mode of the control device 1 illustrated in FIG. 2 and a configuration including the learning unit 110 that carries out unsupervised learning as an example of the learning algorithm. The unsupervised learning is a technique in which only a large amount of input data is given to a learning device and in which a correlation model for estimation of necessary output for fresh input is learned by identification of a feature that implies a correlation among elements of the input data. In the unsupervised learning, compression, classification, formatting, and the like may be carried out for the input data without provision of teacher data corresponding to the input data.

In the machine learning device 100 included in the control device 1 illustrated in FIG. 3, the learning unit 110 includes a model update unit 114 that updates a correlation model M for determination from the state variables S as to whether the spindle of the machine tool is in the conditions of the normal machining or not. The learning unit 110 learns the correlation between the estimated load torque values for the spindle and the acceleration values of the spindle during the normal machining (without the spindle collision) in the machine tool with iterated updates of the correlation model M by the model update unit 114.

An initial value of the correlation model M is a simplified expression (by a linear function, for instance) of the correlation between the estimated load torque values for the spindle and the acceleration values of the spindle during the normal machining (without the spindle collision) in the machine tool, for instance, and is given to the learning unit 110 before start of the unsupervised learning. The model update unit 114 identifies a correlation feature that implies the correlation between the estimated load torque values for the spindle and the acceleration values of the spindle during the normal machining (without the spindle collision) in the machine tool from a large amount of the state variables S given to the learning unit 110 and updates the correlation model M in accordance with a predetermined update rule, for instance, based on the correlation feature.

The control device 1 and the machine learning device 100 of the invention have a merit in that use of the unsupervised learning removes a necessity of collecting data resulting from the spindle collision. Employment of supervised learning causes necessity for the state variables S without the spindle collision and the state variables S with the spindle collision. It is, however, necessary to intentionally make the spindle of the machine tool collide in order to acquire the latter state variables S and there is a fear that a considerable number of machine tools might be made to fail in order to acquire a large amount of data. In the invention with use of the unsupervised learning, in that regard, the correlation model M that is operable can be constructed without deliberate collision of the spindles of the machine tools.

Figure 4:
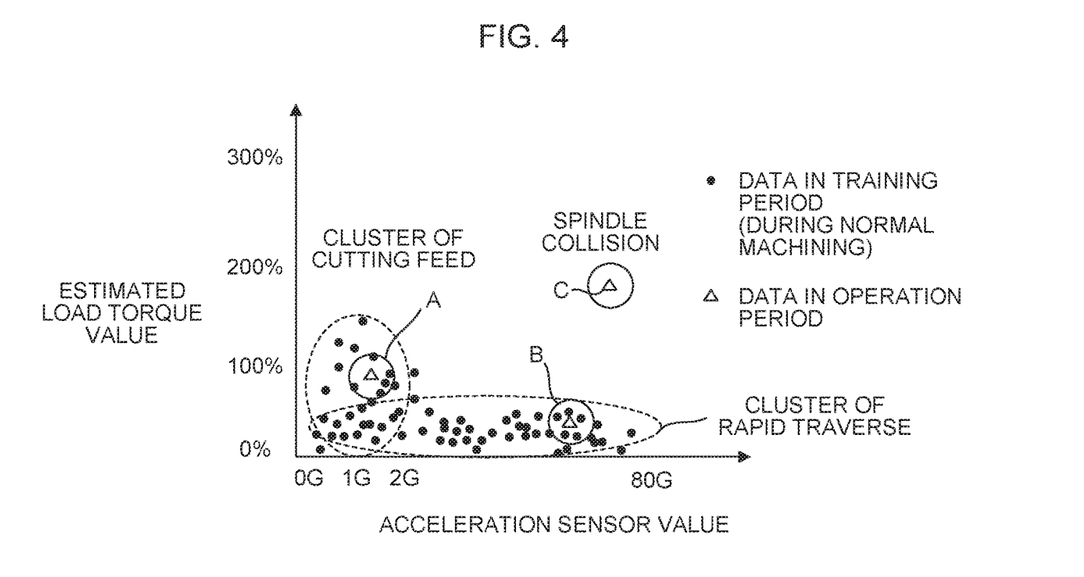
FIG. 4 is a diagram illustrating a determination method with use of a neighborhood method.

For implementation of the unsupervised learning described above, a neighborhood method may be used. In case where the state observation unit 106 included in the machine learning device 100 uses a graph in which a vertical axis represents the estimated load torque value for the spindle and in which a horizontal axis represents the acceleration value of the spindle, for instance, as the correlation model M updated based on the state variables S observed in the training period of the machine learning device 100, the estimated load torque values for the spindle and the acceleration values of the spindle during the normal machining (without the spindle collision) form cluster sets each having a trend, as illustrated in FIG. 4. In an example of FIG. 4, a cluster set of cutting feed and a cluster set of the rapid traverse are formed. In the neighborhood method, a pair (sample) of the estimated load torque value for the spindle and the acceleration value of the spindle that are observed by the state observation unit 106 during operation is plotted on the graph of the correlation model M and a cluster to which the sample belongs may be determined based on which cluster points numbering in k in a vicinity of a point of the sample belong to. In case where the points numbering in k do not reside within a predetermined distance r from the point of the sample, it may be determined that the sample does not belong to any of the clusters. In case of k=5, for instance, five pairs of the estimated load torque value and the acceleration of the spindle in the cutting feed during the normal machining (without the spindle collision) exist in a vicinity of a sample A in FIG. 4 and the sample A therefore belongs to the cluster of the cutting feed in the normal machining. Five pairs of the estimated load torque value and the acceleration of the spindle in the rapid traverse during the normal machining (without the spindle collision) exist in a vicinity of a sample B and the sample B therefore belongs to the cluster of the rapid traverse in the normal machining. In FIG. 4, on the other hand, no pair of the estimated load torque value and the acceleration of the spindle during the normal machining (without the spindle collision) exists in a vicinity (within the distance r) of a sample C and therefore it may be determined that the sample C is a pair of the estimated load torque value and the acceleration of the spindle acquired on a condition with a spindle collision.

Figure 5A:
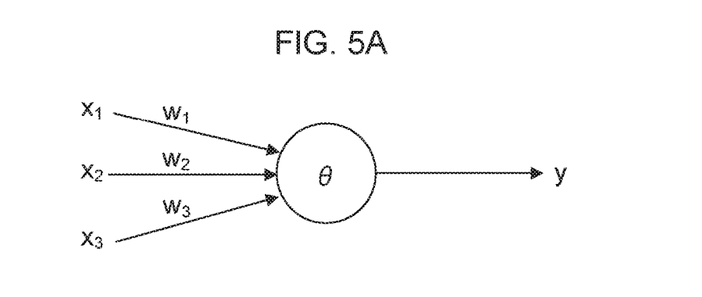
FIG. 5A is a diagram illustrating neurons.
Figure 5B:
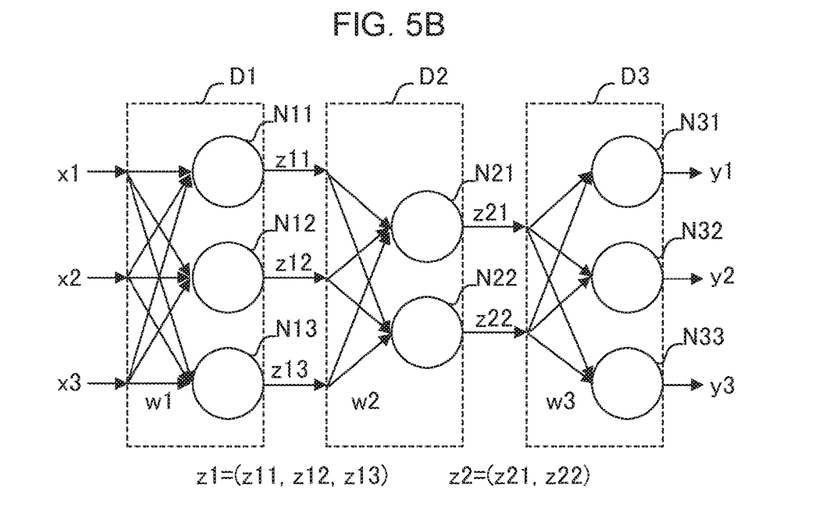
FIG. 5B is a diagram illustrating a neural network.

For the implementation of the unsupervised learning described above, a neural network may be used. FIG. 5A schematically illustrates a model of neurons, FIG. 5B schematically illustrates a model of a three-layer neural network configured by combination of the neurons illustrated in FIG. 5A. The neural network may be configured with use of arithmetic units, storage devices, and the like that are modeled after a neuron model, for instance.

The neurons illustrated in FIG. 5A output a result y of a plurality of inputs x (inputs $x_1$ to $x_3$, as an example). The inputs $x_1$ to $x_3$ are multiplied by weights w ($w_1$ to $w_3$) corresponding to the inputs x. Thus the neurons output the output y expressed by Equation 1 below. In Equation 2, all of the inputs x, the output y, and the weights w are vectors. $\theta$ is a bias and $f_k$ is an activating function.

$$y = f_k(\Sigma_{i=1}^n x_i w_i - \theta) \quad \text{[Equation 2]}$$

In the three-layer neural network illustrated in FIG. 5B, a plurality of inputs x (inputs x1 to x3, as an example) are inputted from a left side and results y (results y1 to y3, as an example) are outputted from a right side. In an example illustrated in the drawing, the inputs x1, x2, and x3 are each multiplied by corresponding weights (generically represented as w1) and the inputs x1, x2, and x3 are each inputted into three neurons N11, N12, and N13.

In FIG. 5B, outputs from the neurons N11 to N13 are generically represented as z1. z1 can be regarded as feature vectors in which feature amounts of the input vectors are extracted. In the example illustrated in the drawing, the feature vectors z1 are each multiplied by corresponding weights (generically represented as w2) and are each inputted into two neurons N21 and N22. The feature vectors z1 represent features between the weights w1 and the weights w2.

In FIG. 5B, outputs from the neurons N21 and N22 are generically represented as z2. z2 can be regarded as feature vectors in which feature amounts of the feature vectors z1 are extracted. In the example illustrated in the drawing, the feature vectors z2 are each multiplied by corresponding weights (generically represented as w3) and are each inputted into three neurons N31, N32, and N33. The feature vectors z2 represent features between the weights w2 and the weights w3. Lastly the neurons N31 to N33 respectively output results y1 to y3.

A so-called deep learning technique with use of a neural network that forms three or more layers may be used.

In the machine learning device 100 included in the control device 1, the learning unit 110 carries out calculations of multi-layer structure pursuant to the above-described neural network with the state variables S used as the inputs x, so that whether to belong to a set of the pairs of the estimated load torques for the spindle and the acceleration of the spindle during the normal machining or not (result v can be outputted. Operation modes of the neural network include a learning mode for use in the training period and a value prediction mode for use in an operation period. The weights w can be learned with use of learning data sets in the learning mode and a value judgment on behavior can be made with use of the learned weights w in the value prediction mode, for instance. In the value prediction mode, detection, classification, inference, and the like can also be carried out.

The above-described configuration of the control device 1 can be described as a machine learning method (or software) that is executed by the processor 101. The machine learning method is a machine learning method by which the correlation between the estimated load torque values for the spindle and the acceleration values of the spindle during the normal machining (without the spindle collision) is learned and includes causing a CPU of a computer to observe the spindle estimated load torque data S1 and the spindle acceleration data S2 as the state variables S representing a current state of environment in which machining is carried out by the machine tool and causing the CPU of the computer to associate and learn the estimated load torque values for the spindle and the acceleration values of the spindle during the normal machining (without the spindle collision) with use of the state variables S.

Figure 6:
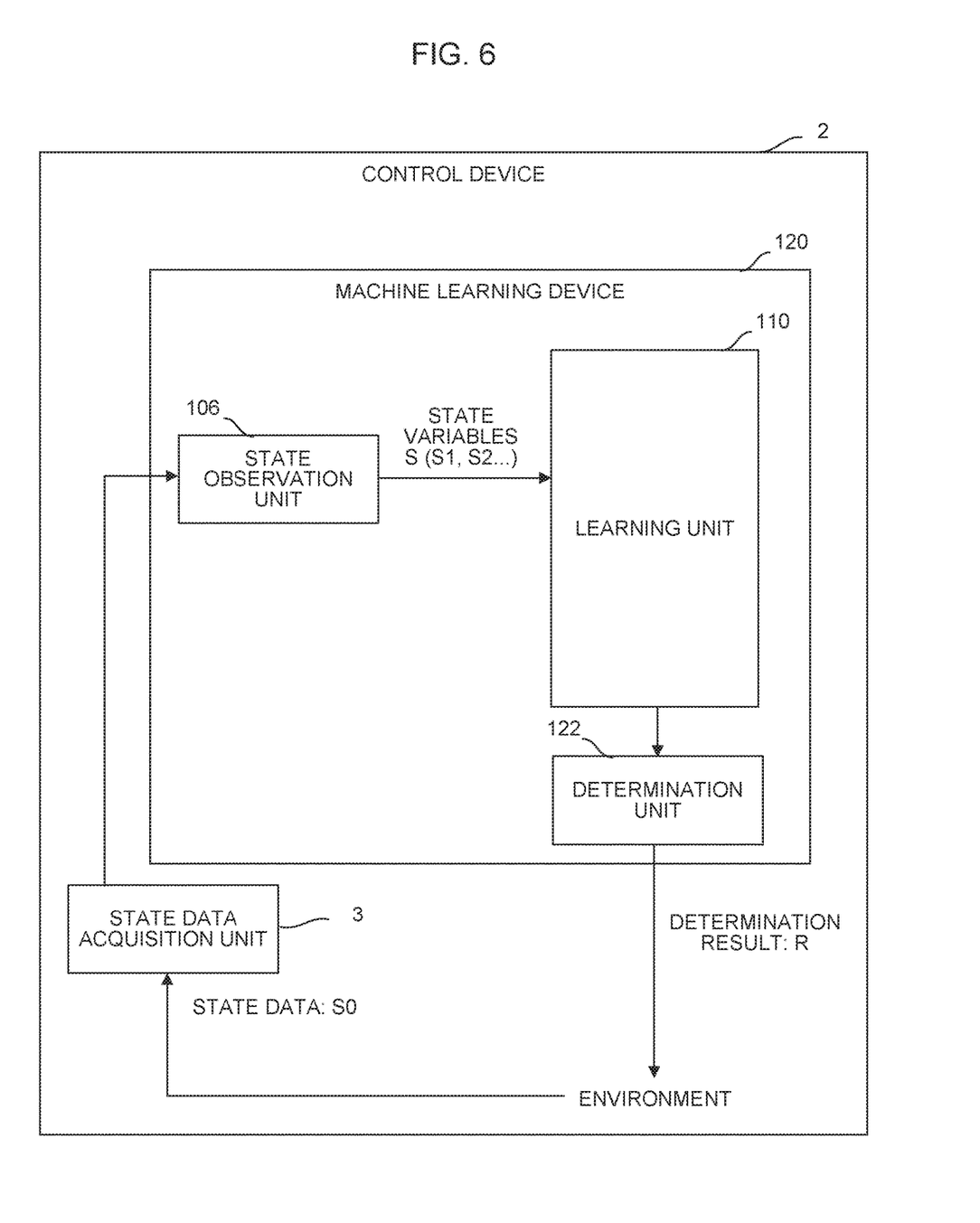
FIG. 6 is a schematic functional block diagram illustrating a control device according to a second embodiment.

FIG. 6 illustrates a control device 2 according to a second embodiment. The control device 2 includes a machine learning device 120 and a state data acquisition unit 3 that acquires, as state data S0, the spindle estimated load torque data S1 and the spindle acceleration data S2 among the state variables S observed by the state observation unit 106. The state data acquisition unit 3 is capable of acquiring the state data S0 from units in the control device 2, appropriate data input by an operator, or the like.

The machine learning device 120 included in the control device 2 includes the software (such as learning algorithms) and the hardware (such as the processor 101) for the self-learning through the machine learning on the correlation between the estimated load torque values for the spindle and the acceleration values of the spindle during the normal machining (without the spindle collision) and additionally includes software (such as arithmetic algorithms) and hardware (such as the processor 101) for output to the control device 2 of a result of a determination on the normality/abnormality of a machining operation corresponding to the estimated load torque value for the spindle and the acceleration value of the spindle that are inputted, based on the results of the learning. The machine learning device 120 included in the control device 2 may have a configuration in which one common processor executes all software such as the learning algorithms and the arithmetic algorithms.

A determination unit 122 may be configured as a function of the processor 101, for instance. Alternatively the determination unit 122 may be configured as software that is intended for making the processor 101 function and that is stored in the ROM 102, for instance. The determination unit 122 outputs the result of the determination on the normality/abnormality of the machining operation corresponding to the estimated load torque value for the spindle and the acceleration value of the spindle, based on the results of the learning by the learning unit 110. When the determination unit 122 outputs the result R of the determination to the control device 2, the control device 2 may raise an alert for a spindle collision or may exercise stop control over the machine tool to be controlled, as appropriate in response.

The machine learning device 120 included in the control device 2 having the above configuration achieves effects equivalent to effects of the machine learning device 100 described above. Particularly the machine learning device 120 is capable of changing the state of the environment by output from the determination unit 122. In the machine learning device 100, on the other hand, a function equivalent to the determination unit for reflection of the results of the learning by the learning unit 110 in the environment can be sought in an external device.

Figure 7:
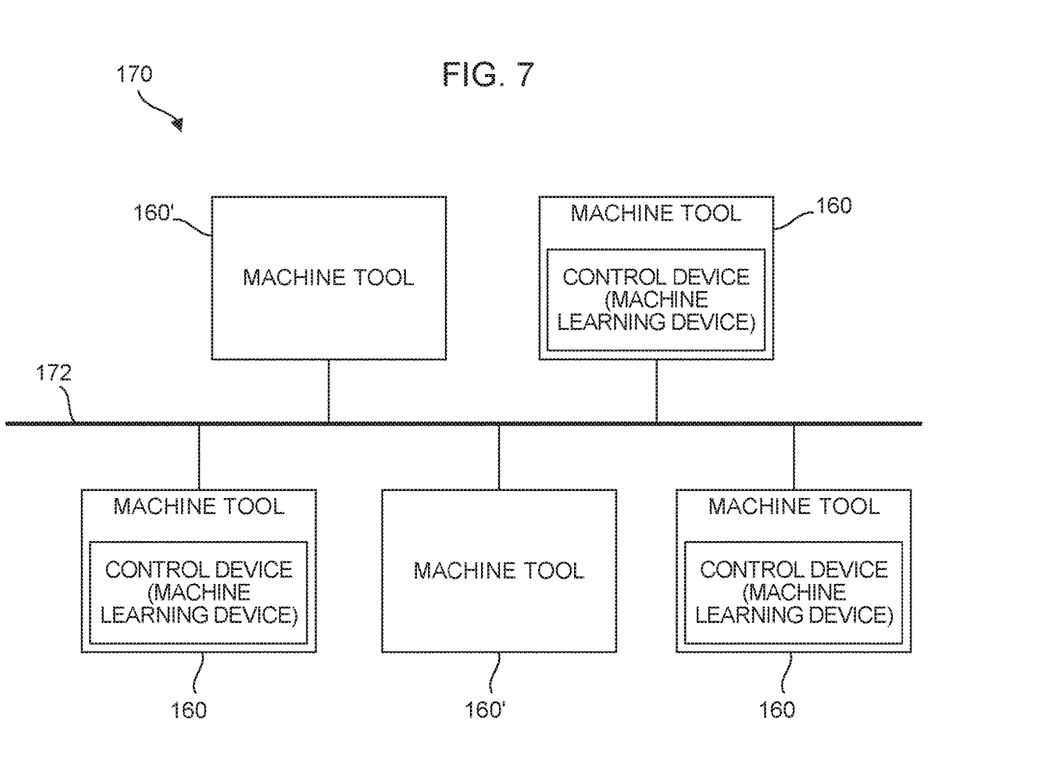
FIG. 7 is a schematic functional block diagram illustrating a mode of a system in which control devices are integrated.

FIG. 7 illustrates a system 170 according to an embodiment that includes a machine tool 160. The system 170 includes a plurality of machine tools 160, 160' that carry out the same operation at least and a wired or wireless network 172 that connects the machine tools 160, 160'. At least one of the plurality of machine tools 160 is configured as the machine tool 160 that includes the control device 2. The system 170 may include the machine tools 160' that do not include the control device 2. The machine tools 160, 160' each have a mechanism necessary for the operation for the same purpose.

In the system 170 having the above configuration, the machine tools 160 including the control device 2 among the plurality of machine tools 160, 160' are capable of automatically and accurately determining the state of the normality/abnormality of the machining operation corresponding to the estimated load torque value for the spindle and the acceleration value of the spindle, with use of the results of the learning by the learning unit 110, without calculation or estimation. Moreover, a configuration can be adopted in which the control device 2 of the at least one machine tool 160 learns the correlation between the estimated load torque values for the spindle and the acceleration values of the spindle during the normal machining (without the spindle collision) that is common among all the machine tools 160, 160' based on the state variables S acquired for each of the other plurality of machine tools 160, 160' and all the machine tools 160, 160' share results of such learning. Consequently, according to the system 170, the speed and reliability of the learning of the correlation between the estimated load torque values for the spindle and the acceleration values of the spindle during the normal machining (without the spindle collision) can be improved with more diverse data sets (including the state variables S) used as the inputs.

Figure 8:
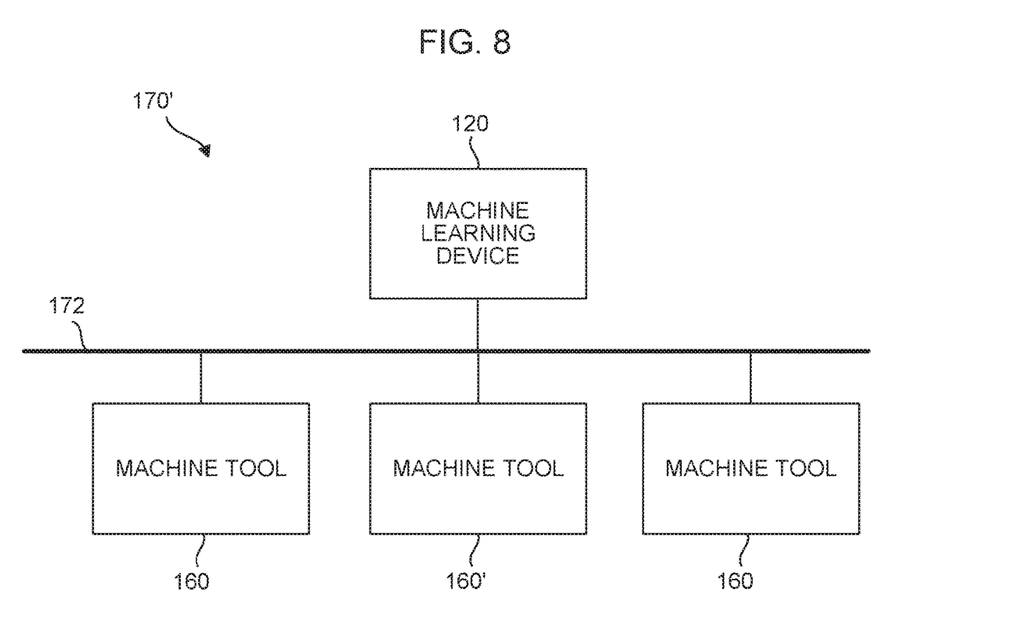
FIG. 8 is a schematic functional block diagram illustrating another mode of a system in which control devices are integrated.

FIG. 8 illustrates a system 170' according to another embodiment that includes the machine tools 160'. The system 170' includes the machine learning device 120 (or 100), the plurality of machine tools 160' having the same mechanical configuration, and the wired or wireless network 172 that connects the machine tools 160' and the machine learning device 120 (or 100).

In the system 170' having the above configuration, the machine learning device 120 (or 100) is capable of learning the correlation between the estimated load torque values for the spindle and the acceleration values of the spindle during the normal machining (without the spindle collision) that is common among all the machine tools 160', based on the state variables S and determination data D that are acquired for each of the plurality of machine tools 160' and automatically and accurately determining the state of the normality/abnormality of the machining operation corresponding to the estimated load torque value for the spindle and the acceleration value of the spindle, with use of the results of the learning, without calculation or estimation.

The system 170' may have a configuration in which the machine learning device 120 (or 100) exists in, for example, a cloud server prepared in the network 172. According to this configuration, a necessary number of machine tools 160' can be connected to the machine learning device 120 (or 100) when necessary, irrespective of places where and periods when the plurality of machine tools 160' exist.

An operator who engages in the system 170, 170' is capable of making a determination as to whether an attainment level of the learning by the machine learning device 120 (or 100) of the correlation between the estimated load torque values for the spindle and the acceleration values of the spindle during the normal machining (without the spindle collision) has reached a requirement level or not, at appropriate time after start of the learning by the machine learning device 120 (or 100).

Though the embodiments of the invention have been described above, the invention is not limited to examples of the embodiments described above and can be embodied in various manners with appropriate modifications.

For instance, the learning algorithms that are executed by the machine learning devices 100, 120, the arithmetic algorithms that are executed by the machine learning device 120, control algorithms that are executed by the control devices 1, 2, and the like are not limited to the above and various algorithms may be employed.

Though the control device 1 (or 2) and the machine learning device 100 (or 120) have been described as devices having different CPUs for the embodiments, the machine learning device 100 (or 120) may be implemented with use of the CPU 11 included in the control device 1 (or 2) and the system programs stored in the ROM 12.

Though the embodiments of the invention have been described above, the invention is not limited to the examples of the embodiments described above and can be embodied in other manners with appropriate modifications.

The invention claimed is:

1. A control device configured to detect a collision of a spindle driven by a servo motor and included in a machine tool, the control device comprising:
 a processor configured to:
  learn a state of the spindle during normal machining without the collision of the spindle, observe spindle estimated load torque data indicating estimated load torque values for the spindle and spindle acceleration data indicating acceleration values of the spindle as state variables representing a current state of an environment,
  learn a correlation between the estimated load torque values for the spindle and the acceleration values of the spindle during the normal machining with use of the state variables,
  perform a detection of the collision of the spindle based on an existence of a number of pairs of the estimated load torque values and the acceleration values of the spindle in a vicinity of a sample of the state variables using a graph in which a vertical axis represents the estimated load torque values of the spindle and a horizontal axis represents the acceleration values of the spindle,
  output a result of the detection, and
  generate an alarm or control the servo motor for driving the spindle included in the machine tool based on the result of the detection.

2. The control device according to claim 1, wherein
 the state variables further include machining condition data that indicates conditions of machining in the machine tool, and
 the processor is further configured to learn a correlation among the estimated load torques for the spindle and the acceleration values of the spindle during the normal machining and the conditions of the machining.

3. The control device according to claim 1, wherein the state variables further include spindle generated sound data indicating information on sounds generated from the spindle, and
 the processor is further configured to learn a correlation among the estimated load torque values for the spindle and the acceleration values of the spindle during the normal machining and the information on the sounds generated from the spindle.

4. The control device according to claim 1, wherein
 the processor is further configured to update a correlation model for determination on a state of normality/abnormality of machining by the machine tool, based on the state variables.

5. The control device according to any one of claim 1, wherein
 the processor is further configured to learn the state of the spindle during the normal machining without the collision of the spindle, through unsupervised learning.

6. The control device according to claim 4, wherein the processor is further configured to
 output a result of the determination on the state of the normality/abnormality of the machining by the machine tool, based on results of the learned correlation.

7. The control device according to claim 1, wherein the processor exists in a cloud server.

8. A machine learning device configured to learn a state of a spindle included in a machine tool during normal machining without a collision of the spindle, the machine learning device comprising:
a processor configured to:
observe spindle estimated load torque data indicating estimated load torque values for the spindle and spindle acceleration data indicating acceleration values of the spindle, as state variables representing a current state of an environment,
learn a correlation between the estimated load torque values for the spindle and the acceleration values of the spindle during the normal machining, with use of the state variables,
perform a detection of the collision of the spindle based on an existence of a number of pair of the estimated load torque value and the estimated spindle acceleration in a vicinity of a sample of the state variables using a graph in which a vertical axis represents the estimated load torque value of the spindle and a horizontal axis represents the acceleration value of the spindle,
output a result of the detection, and
generate an alarm or control the servo motor for driving the spindle included in the machine tool based on the result of the detection.

9. The machine learning device according to claim 8, wherein
the state variables further include machining condition data that indicates conditions of machining in the machine tool, and
the processor is further configured to learn a correlation among the estimated load torques for the spindle and the acceleration values of the spindle during the normal machining and the conditions of the machining.

10. The machine learning device according to claim 8, wherein the state variables further include spindle generated sound data indicating information on sounds generated from the spindle, and
the processor is further configured to learn a correlation among the estimated load torque values for the spindle and the acceleration values of the spindle during the normal machining and the information on the sounds generated from the spindle.

11. The machine learning device according to claim 8, wherein
the processor is further configured to update a correlation model for determination on a state of normality/abnormality of machining by the machine tool, based on the state variables.

12. The machine learning device according to any one of claim 8, wherein
the processor is further configured to learn the state of the spindle during the normal machining without the collision of the spindle, through unsupervised learning.

13. The machine learning device according to claim 11, wherein the processor is further configured to
output a result of the determination on the state of the normality/abnormality of the machining by the machine tool, based on results of the learned correlation.

14. The control device according to claim 8, wherein the processor exists in a cloud server.

* * * * *